Patented June 30, 1942

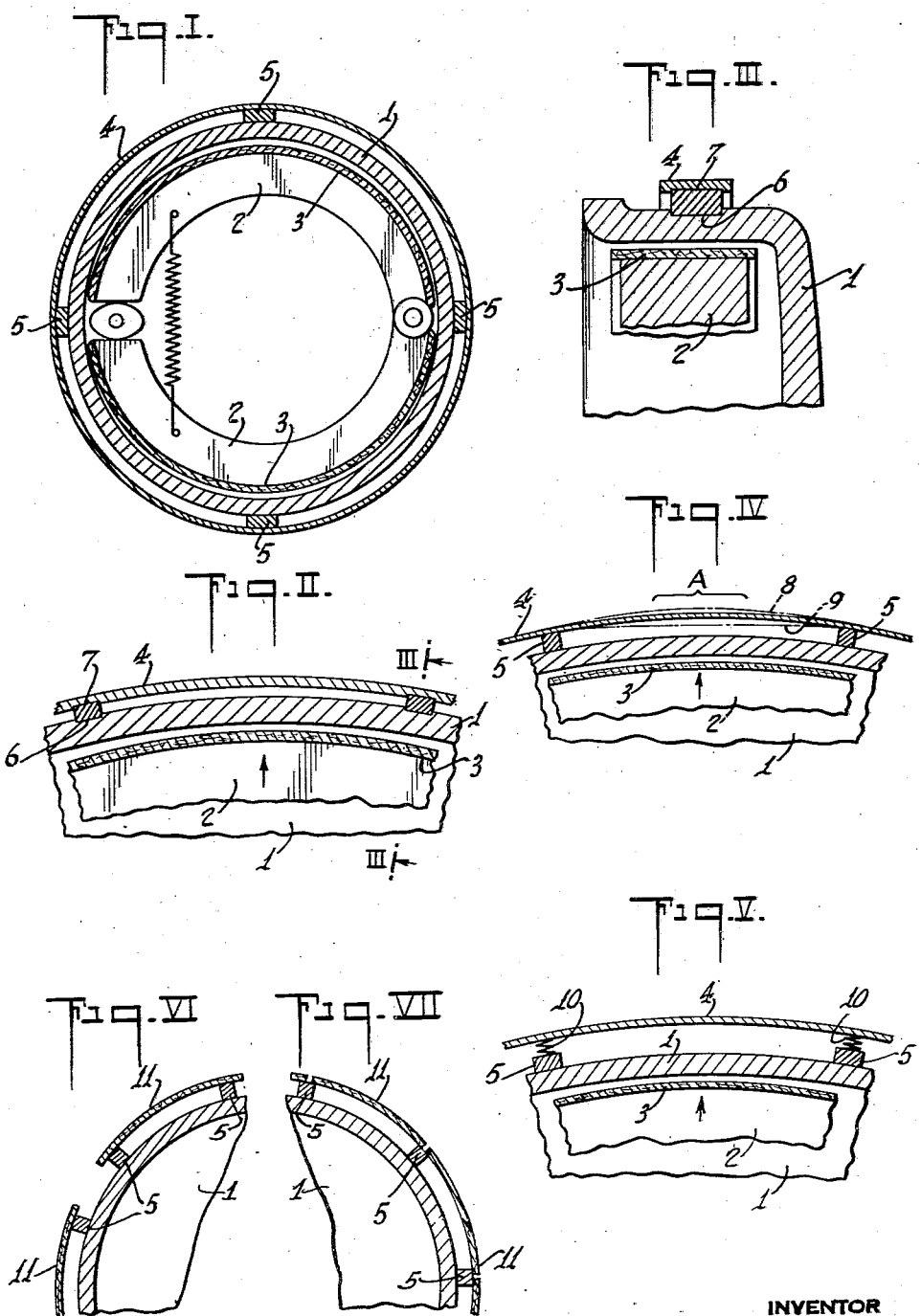

2,287,984

UNITED STATES PATENT OFFICE 2,287,984

DAMPING DEVICE

James Robinson Glazebrook, New York, N. Y., assignor to Johns-Manville Corporation, New York, N. Y., a corporation of New York Application May 22, 1940, Serial No. 336,496

6 Claims. (Cl. 188—218)

The invention relates to a damping device, and more particularly to a damping device wherein a damping member is supported on a vibratile element undergoing vibrations, such as an automobile brake drum.

It has long been a problem to minimize or substantially eliminate the squealing or squeaking of automobile brake assemblies. The squealing is usually caused by vibrations set up in the brake assembly when the braking mechanism is operated, the vibrations generally resulting from the friction between the brake drum and the lining. It is when such "frictional vibration" is within the audible range that the objectionable squealing is produced. The use of conventional sound-proofing materials and devices has not been possible to any great degree because of the structural characteristics of the brake drum and by reason of the high speed at which the drum rotates and the consequent heat generated when the brake is applied.

The invention solves the above problem by providing a damping device comprising a resilient damping member, preferably of metal, supported on the brake drum. Such a construction effectively minimizes or eliminates squealing while having a permanence equal to that of the brake assembly.

An object of the invention is to provide a permanent damping device for vibratile bodies.

Further objects and advantages will appear from the following description and drawing appended thereto.

In the drawing, which illustrates an embodiment of the invention and wherein like reference characters indicate like parts:

Fig. I is a sectional view of a brake assembly embodying the invention;

Fig. II is an enlarged fragmentary transverse sectional view of the embodiment shown in Fig. I;

Fig. III is a view taken on line III—III of Fig. II;

Fig. IV is a fragmentary sectional view of the embodiment shown in Figs. I, II and III;

Fig. V is a fragmentary sectional view of a modification of the invention;

Fig. VI is a fragmentary sectional view of a further variation of the invention; and Fig. VII is a fragmentary sectional view of a further variation of the invention.

In the drawing, an internal brake assembly is shown in Fig. I comprising a conventional brake drum 1 with brake shoes 2 located adjacent the inner surface of the drum. Brake linings 3 are affixed to the surface of the shoes 2 directly adjacent the drum 1. When the brake mechanism is operated, the linings 3 are carried by shoes 2 into contact with drum 1. Under certain conditions the friction produced by the brake sets up vibrations which, when of the proper frequency and amplitude, give rise to an objectionable squealing or squeaking.

In accordance with the invention, there is provided a damping member 4 which is supported on brake drum 1 by supporting element 5. The member 4 may be of any material having the proper flexibility and density, and which is able to withstand the conditions to which it is subjected. Preferably, the member 4 is formed of spring steel. The supporting members 5 may be of any material having the ability to insulate the damping member 4 from the conduction of heat generated in drum 1 and to permanently hold the member 4 firmly on the drum. Preferably, insulators 5 are of asbestos-cement composition, although they may be made from dense resin-bonded fibre board, thermo-setting plastics, woven asbestos, and the like. The conventional brake lining composition, when formed in the proper shape and size, may be used where an inexpensive supporting element is desired.

The damping member 4 is assembled on drum 1 by positioning a plurality of supports 5 around the drum and placing the damping member over the supports, the damping member being of a proper diameter so that it will be held firmly from the drum. The supports and damping member may be secured on the drum by bolts or other conventional fastening means. Preferably, the drum 1 and damping member 4 are formed with mortises 6 and 7, as shown in Figs. II and III, so that when the damping member is fitted over the drum and insulators, the latter set into the mortises 6 of the drum and mortises 7 of the damping member 4, the damping member thus being held firmly on the drum by its own tension.

The efficiency of the damping device is dependent upon the mass or weight of damping member 4. Preferably, the ratio of the mass of member 4 with respect to the cylindrical portion of drum 1 is approximately 1 to 10; that is, the mass of member 4 is one-tenth the mass of the cylindrical portion of drum 1. The mass of the damping member may be less with respect to the brake drum than 1 to 10, although as the proportion becomes greater, the effectiveness of the damping device is decreased. Also, the proportion may be less, although a ratio of approximately 1 to 10 has proven satisfactory in the conventional type brake assembly when considering such factors as cost and structural limitations of the assembly.

The resiliency of member 4 is important when considering the ratio of the mass of the damping member to that of the drum. Generally speaking, the resiliency of member 4 may be decreased as the ratio of the mass of the damping member to that of the drum is increased. Thus, increasing the mass of member 4 permits the resiliency of such member to be decreased. In the preferred embodiment, where the ratio of the mass of the damping member to that of the drum is approximately 1 to 10, the resiliency of member 4 is that of a good grade of spring steel.

It is believed that the effect of the damping device is due in part to a "tuning" action of the damping member 4 and in part to a true "damping" action of the damping member. The importance of either action with respect to the other is not known, although it is believed that in various circumstances one or the other predominates.

Where the effect of the damping device is due to a "tuning" action, the damping member 4 is vibrated by the vibrations of the drum as the braking mechanism is operated. The vibrations of the damping member 4 then either repress the vibrations of the drum or modify the period or frequency of the latter so as to place them outside the audible range. As shown in Fig. IV, area A of damping member 4 is set into vibration and alternately occupies positions 8 and 9.

Where the effect of the damping device is due to a true "damping" action, it is believed that the mass of the damping member 4 lowers the amplitude of the vibrations of the drum 1 due to the force of inertia, and thus places the vibrations outside the audible range.

It should be noted that the resiliency and mass of member 4 are important in either a "tuning" or true "damping" action, and are especially important where the damping effect is due to a combination of the two actions.

While it is believed that the "tuning" action of damping member 4 is usually due to the vibrations set up in area A of member 4, which is the portion of the damping member intermediate any two of the insulated supporters 5, as yet such action may sometimes be due to vibration set up in the entire damping member, when such member is not rigidly supported throughout its length on the drum. Thus the entire damping member may give rise to the "tuning" action instead of just the portions intermediate the insulators.

The member 4 is protected by the insulated supporters 5. Heat generated by the drum during the braking operation cannot be conducted to member 4 either by the portions intermediate the supports 4 or by those directly under the insulators. Consequently, the damping device will have a substantially permanent damping effect.

Preferably, the damping member 4 is a continuous unit, such as a ring, around the drum 1 supported on and separated from the drum by a plurality of insulating supports 5. However, instead of a single continuous unit, the damping member 4 may be formed of a plurality of relatively short sections 11, as shown in Figs. VI and VII, these sections being in themselves damping members and being supported on the drum by insulating supports. When such a plurality of damping members are used, they may be supported on drum 1 by supports 5 either by having the adjacent ends of two damping members 11 supported by one insulator, and with the end of one member either contiguous to or set apart from the end of the adjacent member (see Fig. VII), or by having the members 5 supporting only one end of one member 11 (see Fig. VI), thus providing a plurality of damping devices on one drum, each device comprising a damping member and a plurality of insulated supports.

A variation of the invention is shown in Fig. V and comprises one or more damping members supported on the brake drum by a plurality of supports 5 with each support having a resilient element 10 positioned between it and the damping member. This variation differs from the preferred embodiment only in having the resilient element between the damping member and each insulator, which causes the connection between the damping member and the shoe to be less rigid and thus gives more resilience to all portions of member 4. Resilient element 10 is protected from the heat generated by the drum by support 5.

Resilient elements 10 may, of course, be used without insulators 5, but in such cases the heat generated by drum 1 tends to cause a loss of resilience in elements 10.

The term "damping," as distinguished from "true damping," is intended to broadly define the action of rendering vibration of the brake assembly inaudible.

It should be understood that the details of the description set forth are only for purposes of illustration and that the invention is to be limited only by the scope of the appended claims.

I claim:

1. A brake assembly comprising a brake drum, metallic damping means therefor, and a plurality of members for insulating said damping means from said body, said damping means being supported on said drum by said members with a major portion of said damping means being spaced from said drum in position to be independently vibrated, and the remaining portion of said damping means being in contact with said members.

2. A friction assembly comprising a body having an annular portion subject to frictional vibration, an annular damping means concentrically surrounding the periphery of the annular portion of said body, and a plurality of members for supporting said damping means on said body, a portion of said damping means being spaced from said members and body in position to be independently vibrated.

3. A friction assembly comprising a body having an annular portion subject to vibration, a plurality of arcuate damping means concentrically surrounding the periphery of the annular portion of said body, and a plurality of members for supporting said damping means of said body, each of said damping means being spaced substantially equa-distantly from said body, and a portion of each of said damping means being spaced from said members and body in position to be independently vibrated.

4. A friction assembly comprising a body having an annular portion subject to frictional vibration and a damping device therefor, said damping device comprising a damping portion and a supporting portion, said first-mentioned portion extending concentrically around the periphery of the annular portion of said body and being spaced from said body in position to be independently vibrated, and said second-mentioned portion supporting said first-mentioned portion on said body.

5. A brake assembly comprising a brake drum, damping means therefor, and a plurality of resilient members for supporting said damping means on said drum, a portion of said damping means being spaced from said members and drum in position to be independently vibrated.

6. A friction assembly comprising a body subject to vibration, damping means therefor, and a plurality of members for supporting said damping means on said body, said members comprising a resilient portion and an insulating portion, a portion of said damping means being spaced from said members and said body in position to be independently vibrated.

JAMES ROBINSON GLAZEBROOK.

CERTIFICATE OF CORRECTION.

Patent No. 2,287,984. June 30, 1942.

JAMES ROBINSON GLAZEBROOK.

It is hereby certified that error appears in the printed specification of the above numbered patent requiring correction as follows: Page 2, first column, line 50, before the word "yet" strike out "as"; and that the said Letters Patent should be read with this correction therein that the same may conform to the record of the case in the Patent Office.

Signed and sealed this 8th day of September, A. D. 1942.

(Seal)

Henry Van Arsdale,
Acting Commissioner of Patents.